United States Patent
Kodera

(10) Patent No.: US 8,194,280 B2
(45) Date of Patent: Jun. 5, 2012

(54) DIRECT PRINTING OF A DESIRED OR MULTIPLE APPEARANCES OF OBJECT IN A DOCUMENT FILE

(75) Inventor: Tetsuhiro Kodera, Irvine, CA (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 1283 days.

(21) Appl. No.: 11/701,117

(22) Filed: Jan. 31, 2007

(65) Prior Publication Data

US 2008/0180713 A1   Jul. 31, 2008

(51) Int. Cl.
*G06F 15/00* (2006.01)
(52) U.S. Cl. ......... 358/1.9; 358/1.1; 358/1.13; 345/589; 345/590; 715/277; 715/273; 715/200
(58) Field of Classification Search ........ 358/1.9, 358/1.1, 1.13; 345/589–590; 715/277, 273, 715/200
See application file for complete search history.

(56) References Cited

U.S. PATENT DOCUMENTS

| | | | |
|---|---|---|---|
| 2002/0085219 A1* | 7/2002 | Ramamoorthy | 358/1.9 |
| 2002/0126306 A1 | 9/2002 | Chohsa et al. | |
| 2006/0176295 A1* | 8/2006 | Toho et al. | 345/419 |
| 2007/0024885 A1* | 2/2007 | Kim | 358/1.13 |
| 2007/0086031 A1* | 4/2007 | Li | 358/1.11 |

* cited by examiner

*Primary Examiner* — Benny Q Tieu
*Assistant Examiner* — Martin Mushambo
(74) *Attorney, Agent, or Firm* — Chen Yoshimura LLP

(57) ABSTRACT

A method and apparatus for direct printing of multiple views of 3-D objects in a PDF file is described. When a PDF file containing 3-D object data is sent to a printer, without using an application or print driver, the controller of a printer generates and prints a plurality of views of the 3-D object based on pre-defined viewing angle settings. The printer controller opens the PDF file, converts the 3-D PDF data to PS data based on the viewing angle, performs raster image processing, prints the bitmap images corresponding to the viewing angle, and repeats the process for all viewing angles. The plurality of views may be printed on separate pages, or on one page in an N-in-1 format. More generally, the method applies to direct printing of files containing objects that are capable of providing multiple appearances, where multiple or desired appearances of the objects are automatically printed.

23 Claims, 4 Drawing Sheets

DIRECT PRINTING OF A DESIRED OR MULTIPLE APPEARANCES OF OBJECT IN A DOCUMENT FILE

BACKGROUND OF THE INVENTION

1. Field of the Invention

This invention relates to direct printing of a file of a certain description language, such as PDF file, and in particular, it relates to a method and apparatus for direct printing of multiple views of objects, which provide multiple or variable appearances, such as 3-dimensional objects, in the file.

2. Description of the Related Art

PDF direct printing is a process by which a PDF (Portable Document Format) file is sent directly to a compatible printer device without first using an application or print driver to pre-process the PDF data into a traditional print language such as PDL (Page Description Language). The PDF data is processed by the printer itself and printed. PDF direct printing may be initiated, for example, from a computer connected to the printer, by dragging a PDF file icon to a printer utility icon on the Microsoft® Windows desktop, or by right-clicking the file and choosing the "print" command. It may also be initiated, on a printer that has slots to receive flash or other memory devices, from the printer itself. Some software for managing large printers used in professional print shops also has the ability to initiate PDF direct printing. The Adobe® PDF1.6 specification supports image data for 3-dimensional (3-D) objects, for instance. A 3-D object provides multiple or variable appearances or facades in accordance with the viewing angles by means of user's dragging the object while a PDF file is opened by a PDF viewer application. But when a PDF file containing 3-D object data is printed using PDF direct printing, only one view of the object (i.e. along one viewing angle) is printed. Movie objects also provide multiple appearances or scenes in accordance with lapsed times when it is played back. Existing PDF direct printing software does not print such the objects with a desired view or with different views or multiple views. To print such objects with a desired view or different views, a user is typically required to open the PDF file using an appropriate application such as Adobe® Acrobat®, selects the view(s) (i.e. viewing angle(s)) manually, and print the view(s) manually one at a time. This is often a time-consuming and cumbersome operation.

SUMMARY

Accordingly, the present invention is directed to a method and related apparatus for direct printing of desired or multiple views of objects in a document file.

An object of the present invention is to provide a convenient method for printing a desired or multiple views of a PDF file.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for printing a file containing object data of an object that is capable of providing multiple appearances, which includes: (a) receiving the file to be printed, (b) setting a plurality of appearances for printing the object, and (c) automatically printing a plurality of images of the object data corresponding to the plurality of appearances.

In another aspect, the present invention provides a printer which includes: a communication port for receiving a file to be printed, the file containing object data of an object that is capable of providing multiple appearances, a printer controller for automatically generating a plurality of images of the object data corresponding to a plurality of appearances, and a printing unit for printing the plurality of images.

In still another aspect, the present invention provides a method for printing a file containing object data of an object that is capable of providing multiple appearances, which comprises: (a) receiving the file to be printed and a command defining at least one appearance of the object when printing; (b) setting at least one appearances of the object based on the command; and (c) automatically printing at least one image of the object data corresponding to the at least one appearance.

In yet another aspect, the present invention provides a printer which comprises: a communication port for receiving a file to be printed and a command, the file containing object data of an object that is capable of providing multiple appearances, the command defining at least one appearance of the object when printing; a printer controller for automatically generating at least one image of the object data corresponding to the at least one appearance; and a printing unit for printing the at least one image.

It is to be understood that the foregoing general description and the following detailed description are exemplary and explanatory and are intended to provide further explanation of the invention as claimed.

DETAILED DESCRIPTION OF THE PREFERRED EMBODIMENTS

While the present invention encompasses direct print of document file with any objects insofar as at least one of such objects provide multiple appearances or visual representations in accordance with at least one of viewing angles of the objects or lapsed times when the objects are played back, the following descriptions use 3-D objects s as examples of objects that provide multiple appearances or visual representations, and use multiple views of 3-D objects as examples of multiple appearances or visual representations.

Figure 1:
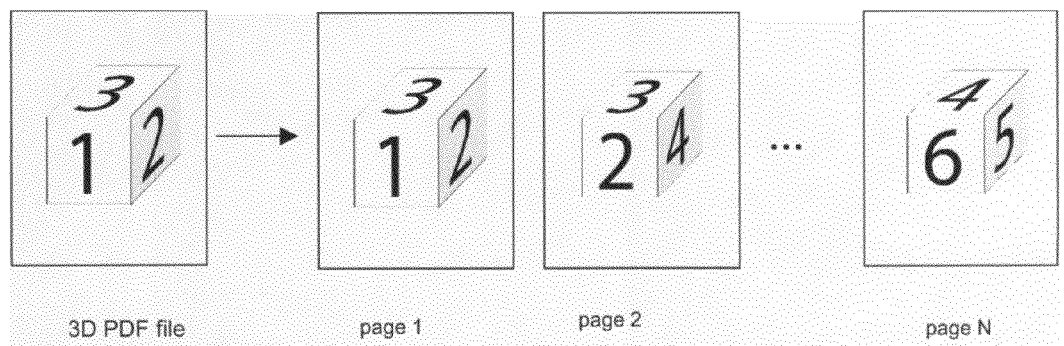
FIG. 1 illustrates multiple-page printouts of multiple views of a 3-D object from a PDF file using a PDF direct printing method according to an embodiment of the present invention.
Figure 2:
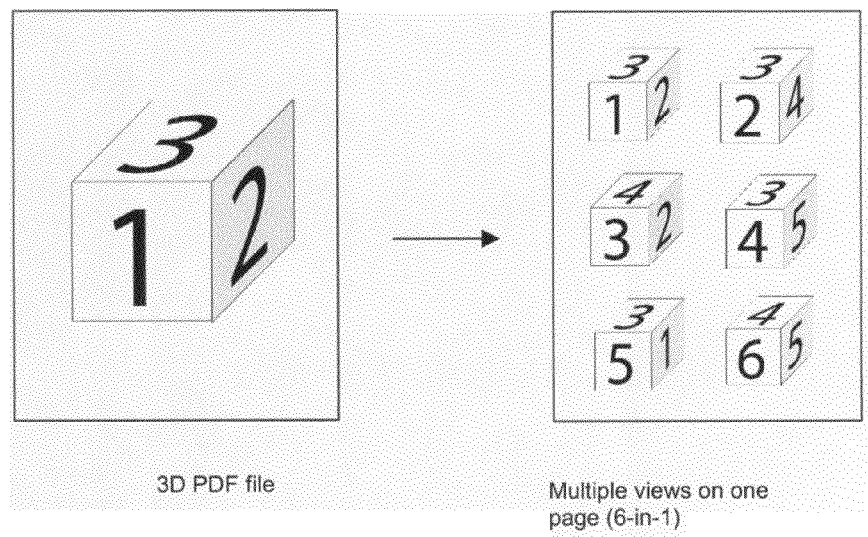
FIG. 2 illustrates a single page printout of multiple views of a 3-D object from a PDF file using a PDF direct printing method according to another embodiment of the present invention.

FIGS. 1 and 2 illustrate multiple-view printouts of a 3-D object from a PDF file using PDF direct printing methods according to embodiments of the present invention. In a first mode, as shown in FIG. 1, the direct printing method prints a plurality of pages, each page containing a view of the 3-D object in the PDF file. In a second mode, as shown in FIG. 2, the direct printing method prints a single page containing a plurality of views of the 3-D object in the PDF file (N-in-1 printing). The printing mode may be selected by the user. In addition, the user may also choose a normal printing mode, i.e., printing only one view of the 3-D object.

PDF direct printing is possible because Adobe® Acrobat® supports plug-in features and the API specification has been opened, enabling software developers to add features and manipulate functions as desired. Inside a printer, the Acrobat® software or a PDF to PS (PostScript) converter is installed as a part of the printer controller to accomplish PDF direct printing. In conventional PDF direct printing, when the printer controller receives PDF direct print data, the printer controller opens the PDF document using Acrobat® or the PDF to PS converter, and converts the PDF data to PS (PostScript) data, which is a sort of page description language data, with pre-determined settings, such as print resolution setting, color conversion setting, screen setting, and so on. The printer controller then performs raster image processing (RIP) on the PS data to generate a bitmap image, and prints the bitmap image.

To implement PDF direct printing of multiple views from 3-D PDF data, several PJL (Printer Job Language) or JDF (Job Definition Format) commands and variables are introduced. Examples include (only PJL examples are shown here):

```
@PJL 3D = True                          /* Enable 3D printing */
@PJL 3DAngle = 45, 90, 135, 180         /* Set viewing angle data */
@PJL 3DMulti = 2-in-1, 4-in-1, 6-in-1, ... /* Set image combination */
```

Note that the viewing angles may be set in PJL by specifying a plurality of individual viewing angle values (as in the above example), or by specifying the increment of the angle (e.g. print one view every 45 degrees), such as:

@PJL 3DAngle=AUTO, 45, 180 /*Increment by 45 deg to 180 deg */

These PJL commands may be generated by a utility program that is used to initiates the PDF direct printing. Such a utility program may also provide an interface to allow the user to set the variable values, including the printing mode variable mentioned above ("@PJL 3DMulti," which sets the mode to one view per page or N-in-1). Although PJL is used as an example in this disclosure, any other suitable language for communicating between a host computer and a printer may be used. The command and variables may also be defined in the form of engine default data, which may be set using the engine operation panel.

Figure 3:
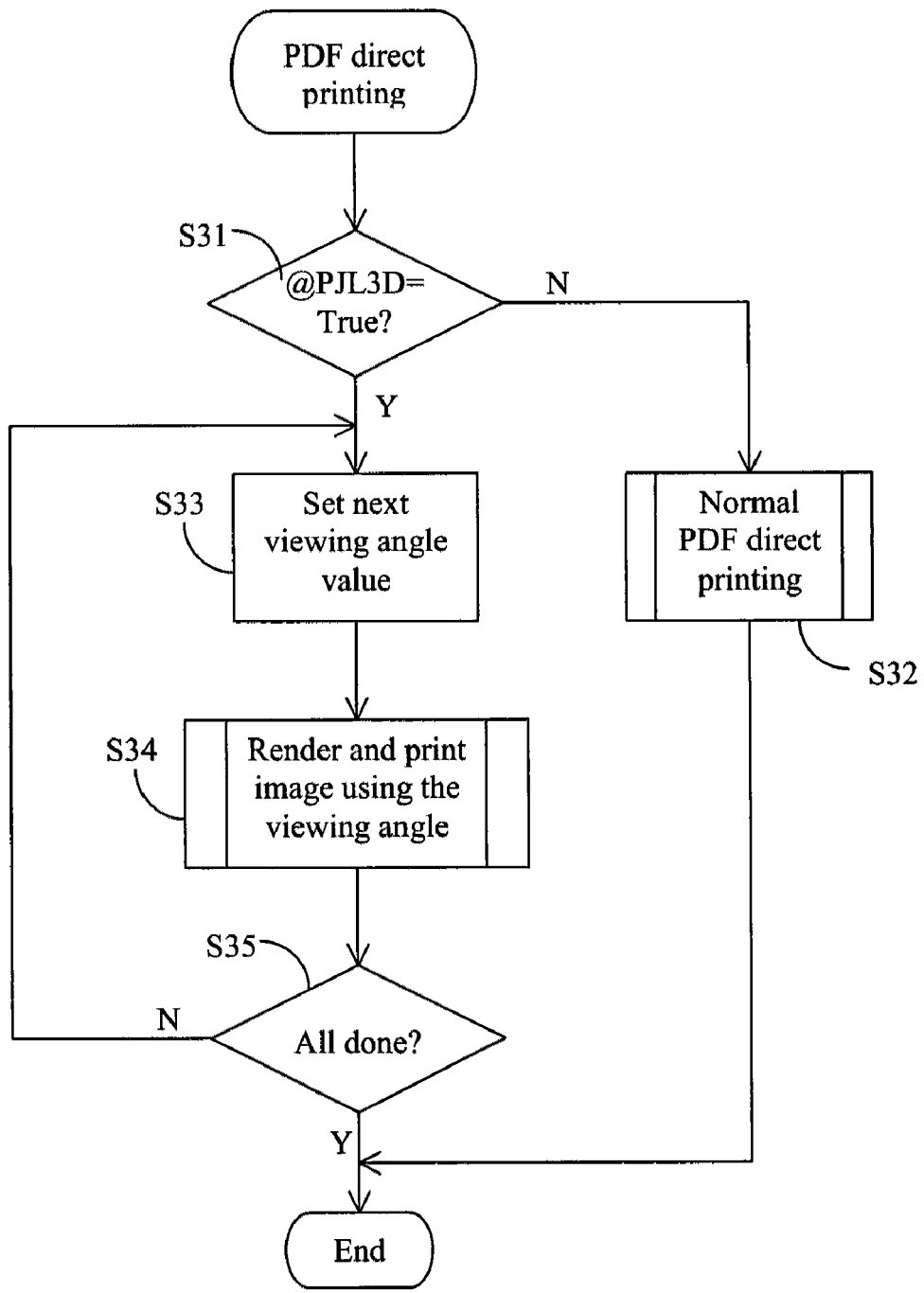
FIG. 3 illustrates a multiple-view PDF direct printing process according to an embodiment of the present invention.

As shown in the flow chart of FIG. 3, at the start of the PDF direct printing process, the printer controller opens the PDF file using Acrobat® or an PDF to PS converter, and reads the PJL variable to determine whether multiple-view 3-D printing is enabled (step S31, "@PJL 3D=True?"). If multiple-view 3-D printing is not enabled ("N" in step S31), normal PDF direct printing is executed (step S32) as in the conventional process described earlier, by which the 3-D object is printed at only one viewing angle. If multiple-view 3-D printing is enabled ("Y" in step S31), the printer controller sets the viewing angle value for the next view to be printed (step S33). This is done based on the viewing angle data set in the PJL command. As pointed out earlier, the PJL command may set a list of individual viewing angles, or set an increment of the angle, in which case step S33 will include calculating the next view angle value. The printer controller then executes a PDF direct printing step to render and print the 3-D object at that viewing angle (step S34). This step includes converting the PDF data to PS data based on the viewing angle, performing raster image processing on the PS data to generate a bitmap image, and printing the bitmap image. The printed image is an image of 3-D object corresponding to the current viewing angle. The PDF direct printing step S34 is repeated with the next viewing angle (step S33) until all viewing angles set by the PJL command are printed (step S35, "all done").

In step S34 of the above-described method, each view of the 3-D object is printed on a separate page. Alternatively, the printer controller may print multiple views on a single page (N-in-1), as illustrated in FIG. 2. This process is illustrated in the flow chart of FIG. 4. Steps S41, S42, and S43 are identical to steps S31, S32 and S33 in the process of FIG. 3. Step S44 is similar to step S34 in FIG. 3, except that the printer controller renders an image of the 3-D object at that viewing angle for N-in-1 printing but does not print it yet. In other words, after the PDF data is converted to PS data based on the viewing angle, the image size is reduced and the image position on the page is adjusted based on the N-in-1 page setting as specified by the "@PJL 3DMulti" command. Preferably, a plurality of templates are pre-defined, one for each paper size (e.g. letter, A4, etc.) and each N value (i.e. the number of images on a page), to specify the image size and position for each view within the N-in-1 page. The steps S43 and S44 are repeated until all images for the viewing angles set by the PJL command are rendered (step S45, "all done"). The N-in-1 image containing a plurality of views of the 3-D object is then printed (step S46). The process shown in FIG. 4 can accommodate multiple-page, multiple-views-per-page situations where each page contains multiple views and multiple pages are needed to print all views of the 3-D object (e.g. a total of 6 views are printed on 2 pages). The printer controller may print all pages at once after all views for the object are rendered, or it may print each page as soon as all views on that page are rendered.

Figure 4:
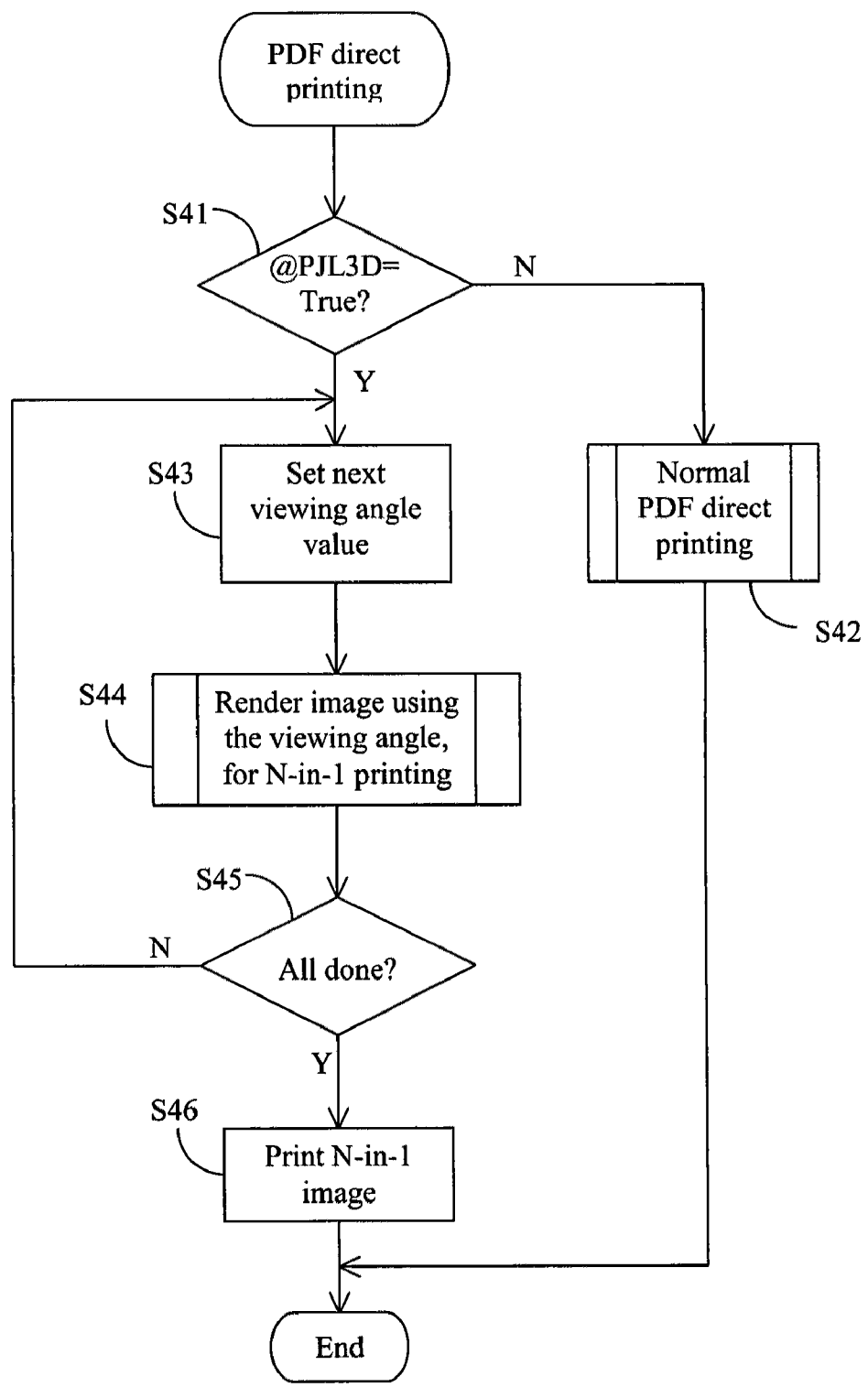
FIG. 4 illustrates a multiple-view PDF direct printing process according to another embodiment of the present invention.

Although not shown in FIGS. 3 and 4, the multiple-view PDF direct printing method can also handle text and other non-3-D content in the same PDF file that contains the 3-D object. To accomplish this, a step is added before step S34 (or S44) to determine whether a given page in the PDF file contains any 3-D object data. If not, then the normal PDF direct printing step S32 (or S42) is executed. If the page contains 3-D object data, then multiple views of the 3-D object are printed, and any non-3-D content on the same page with the 3-D object may be printed normally.

An advantage of the multiple-view PDF direct printing method according to embodiments of the present invention is that it enables the user to print different views of a 3-D object in a PDF file using a direct printing method without having to open a PDF viewer application. Another advantage is that the user does not have to manipulate the object angles using the viewer application and then print each view manually. The printer controller automatically prints multiple views of the 3-D object based on various settings pre-defined by the user or by default. In addition, the N-in-1 printing mode allows the user to print multiple views of the 3-D object on one page without using the viewing application. N-in-1 printouts are often more convenient and efficient for the user, and often useful in areas such as architectural design, mechanical design, etc.

Although the multiple-view direct printing methods are described above in the environment of a PDF file, the present invention is not limited to printing PDF files, and can be applied to direct printing of any types files containing 3-D object data with proper modifications.

Figure 5:
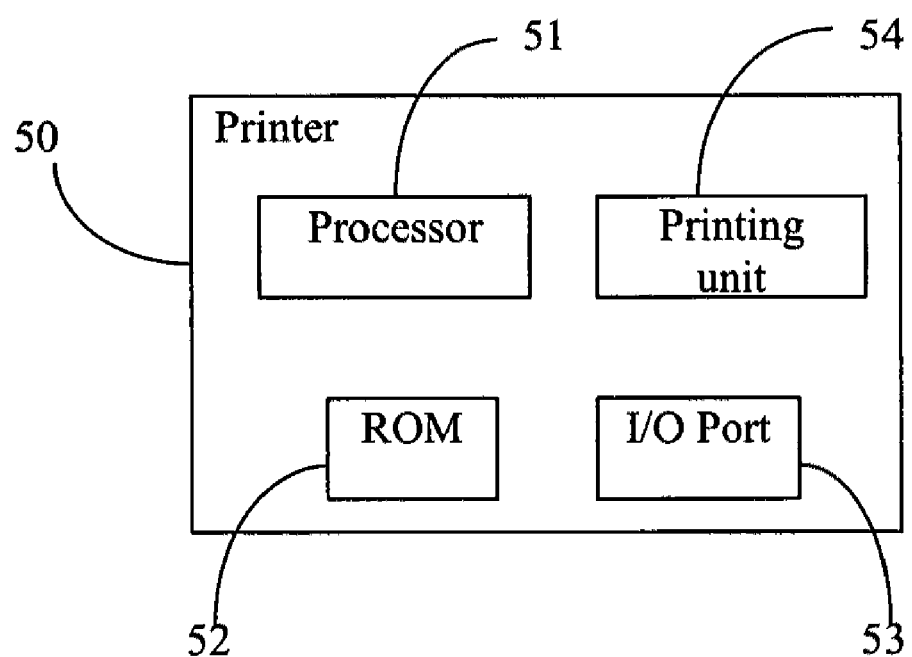
FIG. 5 schematically illustrates a printer in which multiple-view PDF direct printing methods may be implemented.

The methods described above may be implemented by a computer software program running on a printer. As schematically illustrated in FIG. 5, the printer 50 includes a controller processor 51, a ROM 52, a communication port (I/O port) 53 for receiving files to be printed, and a printing unit 54 for carrying out printing. The software program implementing the above-described multiple-view PDF direct printing method is stored in the ROM 52 and executed by the processor 51.

It will be apparent to those skilled in the art that various modification and variations can be made in the multiple-view PDF direct printing method and apparatus of the present invention without departing from the spirit or scope of the invention. Thus, it is intended that the present invention cover modifications and variations that come within the scope of the appended claims and their equivalents.

What is claimed is:

1. A method performed by a printer for printing a file comprising:
   (a) the printer receiving a file to be printed, the file containing object data of an object that is capable of providing multiple appearances, wherein the object is a 3-dimensional object or a movie object and each appearance corresponds to a viewing angle of the 3-dimensional object or a lapsed time of the movie object;
   (b) the printer automatically setting a plurality of appearances of the object including a plurality of viewing angles of the 3-dimensional object or a plurality of lapsed times of the movie object; and
   (c) the printer automatically printing a plurality of images of the object data corresponding to the plurality of appearances of the object including a plurality of viewing angles of the 3-dimensional object or the plurality of lapsed times of the movie object automatically set in step (b).

2. The method of claim 1, wherein in step (c) each of the plurality of images is printed on a separate page.

3. The method of claim 1, wherein in step (c) some or all of the plurality of images are printed on one page.

4. The method of claim 1, further comprising:
   (d) the printer receiving a user input which selects a first mode where each of the plurality of images is printed on a separate page or a second mode where some or all of the plurality of images are printed on one page.

5. The method of claim 1, wherein the file is a Portable Document Format (PDF) file.

6. The method of claim 5, wherein step (c) comprises:
   (c1) converting the object data in the PDF file to page description language (PDL) data based on one of the plurality of appearances set in step (b);
   (c2) performing raster image processing on the PDL data to generate a bitmap image;
   (c3) printing the bitmap image on a page; and
   (c4) repeating steps (c1) to (c3) for other ones of the plurality of appearances.

7. The method of claim 5, wherein step (c) further comprises:
   (c1) converting the object data in the PDF file to page description language (PDL) data based on one of the plurality of appearances set in step (b);
   (c2) performing raster image processing on the PDL data to generate a bitmap image;
   (c3) reducing a size of the bitmap image generated in step (c2) and adjusting its location on a page based on an N-in-1 page setting;
   (c4) repeating steps (c1) to (c3) for other ones of the plurality of appearances to generate a page of bitmap image containing a plurality of reduced-size images of the object data corresponding to the plurality of appearances; and
   (c5) printing the page of bitmap image generated in step (c4).

8. A printer comprising:
   a communication port for receiving a file to be printed, the file containing object data of an object that is capable of providing multiple appearances, wherein the object is a 3-dimensional object or a movie object and each appearance corresponds to a viewing angle of the 3-dimensional object or a lapsed time of the movie object;
   a printer controller for automatically setting a plurality of appearances of the object including a plurality of viewing angles of the 3-dimensional object or a plurality of lapsed times of the movie object, and automatically generating a plurality of images of the object data corresponding to the plurality of appearances; and
   a printing unit for printing the plurality of images.

9. The printer of claim 8, wherein the printer controller generates a plurality of bitmap images each representing an image of the object data corresponding to one of the plurality of appearances.

10. The printer of claim 8, wherein the printer controller generates a page of bitmap image containing a plurality of images of the object data corresponding to a plurality of appearances.

11. The printer of claim 8, wherein the file is a Portable Document Format (PDF) file.

12. The printer of claim 11, wherein for each of the plurality of appearances, the printer controller converts the object data in the PDF file to page description language (PDL) data based on the appearance, performs raster image processing on the PDL data to generate a bitmap image, and prints the bitmap image on a page.

13. The printer of claim 11, wherein for each of the plurality of appearances, the printer controller converts the object data in the PDF file to page description language (PDL) data based on the appearance, performs raster image processing on the PDL data to generate a bitmap image, reduces a size of the bitmap image and adjusting its location on a page based on an N-in-1 page setting, to generate a page of bitmap image containing a plurality of reduced-size images of the object data corresponding to the plurality of appearances, and prints the page of bitmap image.

14. A method performed by a printer for printing a file comprising:
   (a) the printer receiving the file to be printed and a command, the file containing object data of an object that is capable of providing multiple appearances, wherein the object is a 3-dimensional object or a movie object and each appearance corresponds to a viewing angle of the 3-dimensional object or a lapsed time of the movie object, the command defining a plurality of appearances of the object;
   (b) the printer automatically setting a plurality of appearances of the object, including a plurality of viewing angles of the 3-dimensional object or a plurality of lapsed times of the movie object, based on the command; and
   (c) the printer automatically printing a plurality of images of the object data corresponding to the plurality of appearances including a plurality of viewing angles of the 3-dimensional object or the plurality of lapsed times of the movie object set in step (b).

15. The method of claim 14, wherein the file is a Portable Document Format (PDF) file containing the object data.

16. The method of claim 14, wherein step (c) comprises:
(c1) converting the object data in the PDF file to page description language (PDL) data based the at least one appearance set in step (b);
(c2) performing raster image processing on the PDL data to generate a bitmap image; and
(c3) printing the bitmap image on a page.

17. The method of claim 16, wherein when a plurality of appearances are indicated by the command, step (c) further comprises:
(c4) repeating steps (c1) to (c3) for other ones of the plurality of appearances.

18. The method of claim 14, wherein when a plurality of appearances are indicated by the command, step (c) further comprises:
(c1) converting the object data in the PDF file to page description language (PDL) data based on one of the plurality of appearances set in step (b);
(c2) performing raster image processing on the PDL data to generate a bitmap image;
(c3) reducing a size of the bitmap image generated in step (c2) and adjusting its location on a page based on an N-in-1 page setting;
(c4) repeating steps (c1) to (c3) for other ones of the plurality of appearances to generate a page of bitmap image containing a plurality of reduced-size images of the object data corresponding to the plurality of appearances; and
(c5) printing the page of bitmap image generated in step (c4).

19. A printer comprising:
a communication port for receiving a file to be printed and a command, the file containing object data of an object that is capable of providing multiple appearances, wherein the object is a 3-dimensional object or a movie object and each appearance corresponds to a viewing angle of the 3-dimensional object or a lapsed time of the movie object, the command defining a plurality of appearances of the object when printing;
a printer controller for automatically setting a plurality of appearances of the object, including a plurality of viewing angles of the 3-dimensional object or a plurality of lapsed times of the movie object, based on the command and automatically generating a plurality of images of the object data corresponding to the plurality of appearances; and
a printing unit for printing the plurality of images.

20. The printer of claim 19, wherein the printer controller generates at least one bitmap image representing at least one image of the object data corresponding to the at least one appearance.

21. The printer of claim 19, wherein the file is a Portable Document Format (PDF) file containing 3-dimensional object data.

22. The printer of claim 21, wherein when a plurality of appearances are indicated by the command, for each of the plurality of appearances, the printer controller converts the object data in the PDF file to page description language (PDL) data based on the appearance, performs raster image processing on the PDL data to generate a bitmap image, and prints the bitmap image on a page.

23. The printer of claim 21, wherein when a plurality of appearances are indicated by the command, for each of the plurality of appearances, the printer controller converts the object data in the PDF file to page description language (PDL) data based on the appearance, performs raster image processing on the PDL data to generate a bitmap image, reduces a size of the bitmap image and adjusting its location on a page based on an N-in-1 page setting, to generate a page of bitmap image containing a plurality of reduced-size images of the object data corresponding to the plurality of appearances, and prints the page of bitmap image.

\* \* \* \* \*